INVENTOR
BOHUMIR SRAMEK
BY Floyd B. Guernsey
AGENT

Sept. 9, 1969 B. SRAMEK 3,466,562

GATED DIFFERENTIAL TO SINGLE-ENDED AMPLIFIER

Filed Aug. 30, 1968 4 Sheets-Sheet 2

3,466,562

GATED DIFFERENTIAL TO SINGLE-ENDED AMPLIFIER

Bohumir Sramek, 5701 N. 41st Drive, Phoenix, Ariz. 85019

Filed Aug. 30, 1968, Ser. No. 756,529
Int. Cl. H03f 3/68
U.S. Cl. 330—30 14 Claims

ABSTRACT OF THE DISCLOSURE

A gated amplifier has a pair of signal-input terminals and a single output terminal. The amplifier has means for amplifying a differential signal applied to the signal-input terminals and for providing an output signal to the output terminal. The amplifier has means for attenuating any common-mode signal applied to the signal-input terminals.

Background of the invention

This invention relates to magnetic memory devices and more particularly to a gated amplifier for retrieving the information stored in a magnetic memory.

Data processing systems employ memories which are used to store information for use in data processing. These memories may comprise a plurality of magnetic cores or they may comprise a thin film of magnetic material deposited on a sheet of nonmagnetic material. When these magnetic materials are deposited in the presence of a magnetic field, the thin magnetic film exhibits a property of uniaxial anisotropy. Here uniaxial anisotropy is understood to mean that tendency of groups of molecules called "magnetic domains" throughout the film to align themselves along a preferred axis of magnetization. This preferred axis is often referred to as an "easy axis," while the direction of magnetization perpendicular to this axis in the plane of the film is often referred to as the transverse or "hard axis" of the film. The uniaxial thin magnetic film exhibits a single easy axis of magnetization defining opposite stable states of remnant flux orientation. In one of these stable states the magnetic domains of the film may be aligned in one direction along the easy axis to represent a binary 1. In the other of the stable states, the magnetic domains may be aligned in the opposite direction along the easy axis to represent a binary 0.

A matrix of electrical conductors including sense lines and write lines may be positioned adjacent to the thin film and electrical currents in the write lines may be used to rotate the magnetic domains in small selected areas or "memory sites" of the thin film and to store or "write" digital information in these sites. Electrical currents in the sense lines may be used to detect the direction of magnetization of the film in predetermined memory sites and to "read" the digital information stored in these sites.

In order to provide a large amount of storage capacity in a small volume, the individual memory sites must be made very small; however, it has been found that the smaller the memory sites, the smaller the signal which is developed when information is read from the memory sites. The electrical currents used to write digital information in the memory sites produce noise pulses having a relatively large amplitude. It is desirable, therefore, to provide an improved circuit which will attenuate the noise and amplify the desired signal.

It is also desirable that the circuit for amplifying the signal be constructed as a microelectronics circuit by forming the entire circuit on a single "chip" or block composed of semiconductor material. Such microelectric circuits should be directly coupled, without coupling capacitors between the various stages, as such coupling capacitors are difficult to form on a chip.

It is, therefore, an object of this invention to provide an improved amplifier for use with a magnetic memory.

Another object of this invention is to provide an improved amplifier which amplifies the signals read from a magnetic memory.

A further object of this invention is to provide an improved amplifier which reduces noise developed during the read operation.

Still another object of this invention is to provide an improved amplifier which utilizes small values of input signals.

A still further object of this invention is to provide an improved direct-coupled amplifier for use with a magnetic memory.

Another object of this invention is to provide an improved amplifier which uses a differential input signal and provides a signal to a single output terminal.

Summary of the invention

The foregoing objects are achieved in a gated amplifier circuit employing first and second current-steering circuits, an inverting amplifier, a grounded-base amplifier and an emitter follower. The gated amplifier circuit has two signal-input terminals, with each of the input terminals being coupled to one of the current-steering circuits. One of the current-steering circuits is connected to the input lead of the inverting amplifier and the other current-steering circuit is connected to the output lead of the inverting amplifier. The current-steering circuits are connected to first and second sense lines so that common-mode noise developed on these sense lines is cancelled in the gated amplifier, but differential signals which are picked up by the sense lines are amplified by the gated amplifier.

Other objects and advantages of this invention will become apparent from the following description when taken in connection with the accompanying drawings.

Description of the preferred embodiment

Figure 1:
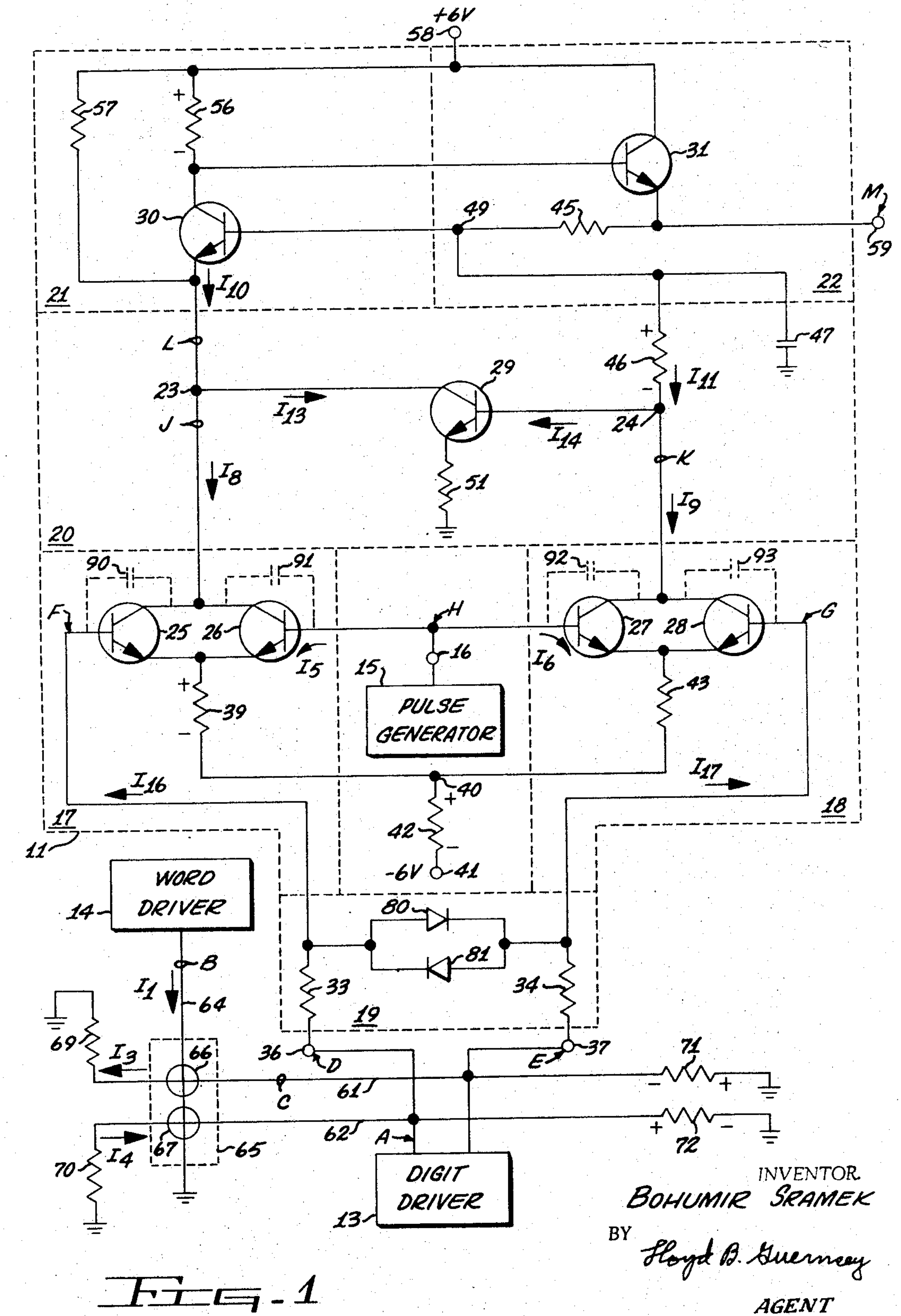
FIG. 1 is a circuit diagram of one embodiment of the instant invention.

The system for storing and retrieving information as shown in FIG. 1 includes a gated differential to single-ended amplifier 11, a first generator or digit driver 13, and a second generator or word driver 14 and a pulse generator 15. In the illustrated embodiment the differential to single-ended amplifier 11 includes a pair of current-steering circuits 17 and 18, a signal amplitude limiter 19, an inverting amplifier 20, a grounded-base amplifier 21 and an emitter follower 22. The differential to single-ended amplifier includes transistors 25–31, each having a base, an emitter and a collector. The bases of transistors 25 and 28 are connected by resistors 33 and 34 to signal-input terminals 36 and 37 respectively and the bases of transistors 26 and 27 are connected to the pulse generator 15. The emitters of transistors 25 and 26 are connected by resistor 39 to a junction point 40. A resistor 42 is connected between junction point 40 and a suitable reference potential, such as −6 volts and the emitters of transistors 27 and 28 are connected by a resistor 43 to junction point 40.

Resistors 45 and 46 are serially connected between the emitter of transistor 31 and the collectors of transistors 27 and 28. A capacitor 47 connected between a junction joint 49 between resistors 45 and 46 and a reference potential, such as ground, provides a signal ground at junction point 49. A resistor 57 is connected between the emitter of transistor 29 and ground. The value of resistors 46 and 51 in the inverting amplifier 20 are chosen so that the amplifier has a gain of −1. The collector of transistor 29 is connected to the collectors of transistors 25 and 26 and the base of transistor 29 is connected to the collectors of transistors 27 and 28. The base of transistor 30 is connected to junction point 49 so that capacitor 47 provides a signal ground at the base of transistor 30.

The differential to single-ended amplifier 11 may be used with any source of differential signals such as a magnetic core memory or a thin film memory. FIG. 1 illustrates one such use with a thin film memory. The thin film memory includes first and second sense or digit lines 61 and 62 connected to signal-input terminals 37 and 36 respectively to provide input signals to the differential to single-ended amplifier 11. A first conductor or word line 64 is connected to word driver 14 which provides a current for reading digital information stored in a pair of thin film memory sites 66 and 67. Word line 64 is mounted transversely to the digit lines 61 and 62 in a plane parallel to the plane of thin film memory sites 66 and 67. A first pair of resistors 69 and 70 are serially connected between one end of each of the digit lines 61 and 62, and a second pair of resistors 71 and 72 are serially connected between the other ends of digit lines 61 and 62.

Each pair of digit lines has a fixed characteristic impedance which is determined by the physical dimensions of the lines. Each of the resistors which are connected between one end of each of the digit lines and ground is selected to match the character impedance of the lines. Since digit lines 61 and 62 are terminated by matched impedances, signals on lines 61 and 62 are not reflected and these signals are not distorted.

Digit driver 13 and word driver 14 provide current for writing information into the memory sites. When it is desired to write information into a predetermined memory site, a pulse of current is applied to the word line which is mounted adjacent to the memory site and another pulse of current is applied to the digit line which is also mounted adjacent to the memory site. When it is desired to read the information stored in a predetermined memory site, a pulse of current is applied to the word line which is mounted adjacent to the memory site.

Figure 3:
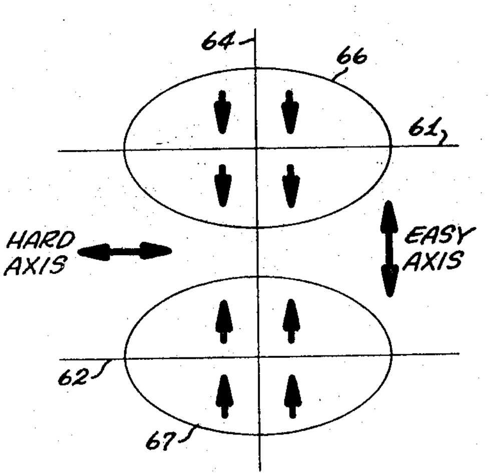
FIGS. 3–7 are enlarged views of a portion of the invention shown in FIG. 1 and illustrate the operation of the present invention.
Figure 4:
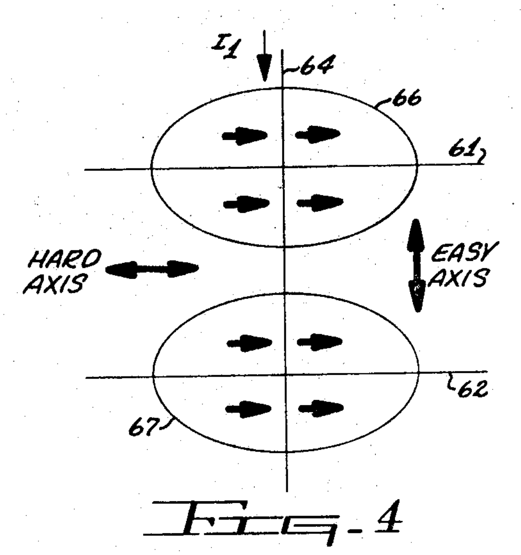

The operation of the system for storing and retrieving information in thin magnetic films in FIG. 1 will now be described in connection with the waveforms shown in FIG. 8, and with the memory sites shown in FIGS. 3–7. A section of the thin film memory 65 shown in FIG. 1, has been enlarged in FIGS. 3–7 to more clearly show the operation of the circuit. When there is no electrical current in any of the lines adjacent to the memory sites, the magnetic domains in the memory sites are aligned parallel to the easy axis shown in FIGS. 3–7. These magnetic domains may be aligned in either an upward direction parallel to the easy axis or in a downward direction parallel to the easy axis. FIG. 3 illustrates alignment of the magnetic domains when a binary 0 is stored in memory sites 66 and 67. The magnetic domains in the film of memory site 66 are aligned in a downward direction parallel to the easy axis while the magnetic domains in memory site 67 are aligned in an upward direction parallel to the easy axis. At this time there is no current in word line 64 or in digit lines 61 and 62.

Figures 5, 6, 7:
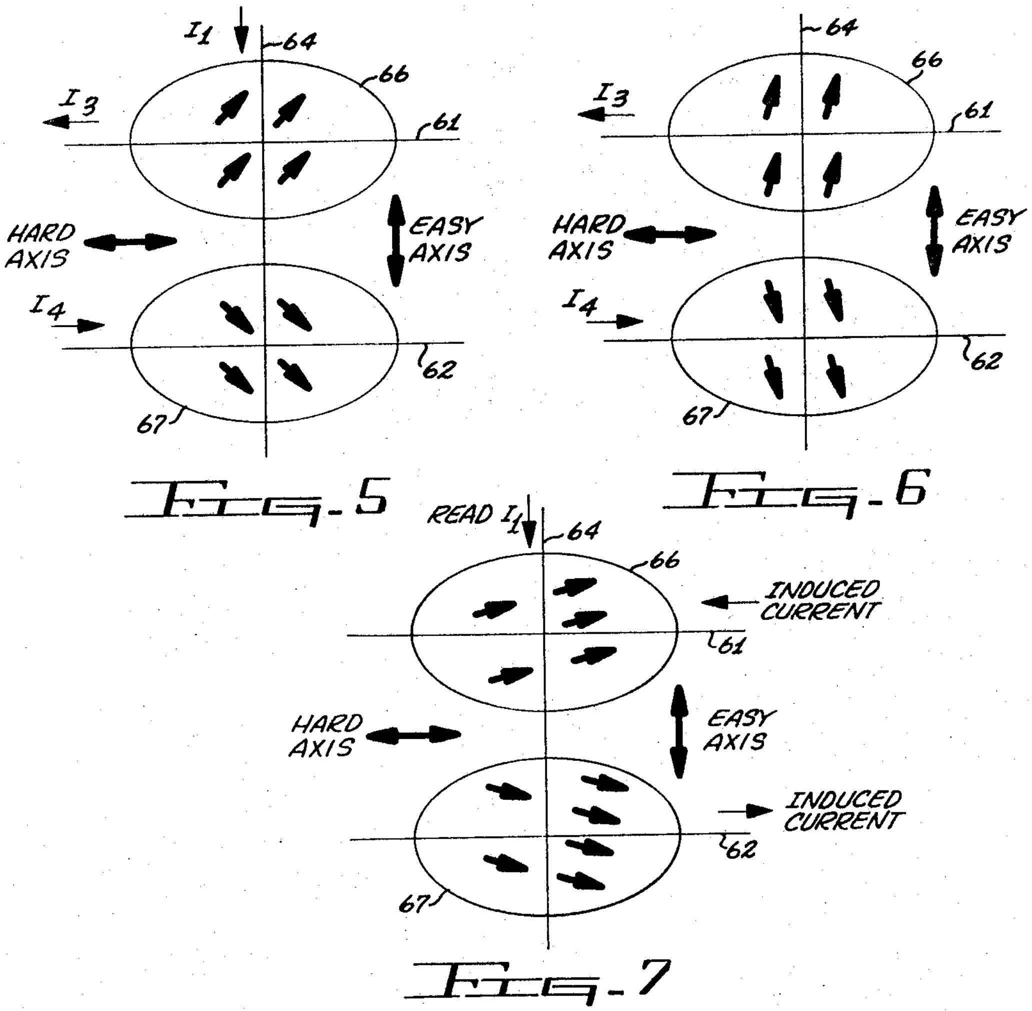

FIGS. 3, 4, 5 and 6 show a series of steps used to change the information in memory sites from a binary 0 shown in FIG. 3 to a binary 1 shown in FIG. 6. In the first step, the magnetic domains in memory sites 66 and 67 are rotated into the horizontal position shown in FIG. 4 by a current $I_1$ which is applied to word line 64. Current $I_1$ produces a magnetic field around word line 64 which causes the magnetic domains in memory sites 66 and 67 to be aligned in a horizontal direction.

In the second step, currents $I_3$ and $I_4$ are applied to digit lines 61 and 62 at the same time that current $I_1$ flows in the word line 64. Currents $I_3$ and $I_4$ produce magnetic fields around word lines 61 and 62. The field around digit line 61 combined wtih the field around word line 64 cause the magnetic domains in the memory site 66 to align in a slightly upward direction as shown in FIG. 5. The field around digit line 62 combined with the field around word line 64 cause the magnetic domains in memory site 67 to align in a slightly downward direction.

In the third step, currents $I_3$ and $I_4$ are still applied to digit lines 61 and 62 when the current $I_1$ is no longer flowing in word line 64. The magnetic field around digit line 61 causes the magnetic domains in memory site 66 to align in an upward direction while the magnetic field around digit line 62 causes the magnetic domains in memory site 67 to align in a downward direction. When the currents $I_3$ and $I_4$ are not applied to digit lines 61 and 62 the magnetic domains remain aligned with the easy axis as shown in FIG. 6. Thus, it is seen that a combination of current $I_1$ in word line 64 and currents $I_3$ and $I_4$ in the digit lines 61 and 62 rotate the magnetic domains in memory sites 66 and 67 from the position shown in FIG. 3 to the position shown in FIG. 6.

When it is desired to read the information stored in memory sites 66 and 67, current $I_1$ is applied to word line 64. Current $I_1$ provides a magnetic field which causes the magnetic domains to rotate from the vertical alignment shown in FIG. 6 to the horizontal alignment shown in FIG. 7. The clockwise rotation of the magnetic domains in memory site 66 causes an induced pulse of current to flow from right to left in digit line 61 as shown in FIG. 7. The counterclockwise rotation of the magnetic domains in memory site 67 causes a pulse of induced current to flow from left to right in digit line 62 as shown. Thus, current $I_1$ can be used to induce pulses of current in digit lines 61 and 62 which indicate the direction of rotation of the magnetic domains in the memory sites and indicates the type of binary information which has been stored in memory sites 66 and 67.

The differential to single-ended amplifier 11 of FIG. 1 amplifies the voltages which are developed by the induced currents in digit lines 61 and 62 and produces an output signal which indicates the type of information which has been stored in the memory sites. The amplifier 11 converts the differential signals at the input terminals 36 and 37 to a signal at the signal-output terminal 59. The differential to single-ended amplifier also attenuates signals from the digit driver 13 and other undesired signals or noise so that these undesired signals do not appear at the signal-output terminal 59.

The operation of the gated amplifier will now be discussed in connection with the waveforms shown in FIG. 8. Signals can be amplified by the gated amplifier 11 only when a negative pulse is applied to terminal 16 by pulse generator 15, at all other times signals at input terminals 36 and 37 will not be transmitted through the amplifier. When there is no negative pulse at the output terminal 16 of the pulse generator 15, transistors 26 and 27 will each be rendered conductive and transistors 25 and 28 will be rendered non-conductive. A positive potential at terminal 16 causes a current $I_5$ to flow from terminal 16 through base to emitter of transistor 26, through resistors 39 and 42 to terminal 41. Current $I_5$ renders transistor 26 conductive. When transistor 26 is conductive a current flows from terminal 58 through resistor 56, from collector to emitter of transistor 30, from collector to emitter of transistor 26, through resistors 39 and 42 to terminal 41.

A typical transistor requires approximately +.7 volt between the base and the emitter to cause the transistor to be rendered conductive. For example, when the voltage at the base of transistor 26 is +.5 volt and the transistor is conductive, the voltage at the emitter of transistor 26 is −.2 volt. To ensure that one of the transistors 25 and 26 is conductive and the other is non-conductive, the voltage at the base of the transistor which is conductive must be approximately +.1 volt more positive than the voltage at the base of the other transistor. When the voltage at the emitters of transistors 25 and 26 is −.2 volt, a +.6 volt at the base of transistor 25 is required to render transistor 25 conductive and to render transistor 26 non-conductive. The signal amplitude limiter clips the amplitude of the input signal at terminal 36 so that the maximum positive voltage at the base of transistor 25 is +.35 volt. Thus, a signal at input terminal 36 cannot render transistor 25 conductive when a +.5 volt is applied to the base of transistor 26. The positive voltage at terminal 16 also causes a current $I_6$ to flow from terminal 16 through base to emitter of transistor 27, through resistors 43 and 42 to terminal 41. Current $I_6$ renders transistor 27 conductive. When transistor 27 is conductive, transistor 28 is held non-conductive by the voltage at the emitter so that a signal at input terminal 37 cannot render transistor 28 conductive.

When pulse generator 15 applies a negative pulse of voltage to terminal 16, transistors 26 and 27 are rendered non-conductive, and differential signals at signal-input terminals 36 and 37 will be amplified by amplifier 11. When transistors 26 and 27 are rendered non-conductive the current through transistors 25 and 28 is determined by the value of the voltage at signal-input terminals 36 and 37. When there is no voltage applied to terminal 36 and terminal 37, the voltage at terminal 41 causes a current to flow which renders transistors 25 and 28 conductive. A current $I_{16}$ flows from terminal 36 through resistor 33, from base to emitter of transistor 25 through resistors 39 and 42 to terminal 41, thereby rendering transistor 25 conductive. When transistor 25 is rendered conductive, current flows from terminal 58 through resistor 56, from collector to emitter of transistor 30, through collector to emitter of transistor 25, through resistors 39 and 42 to terminal 41. A current $I_{17}$ flows from terminal 37 through resistor 34, from base to emitter of transistor 28, through resistors 43 and 42 to terminal 41, thereby rendering transistor 28 conductive. When transistor 28 is rendered conductive, a current flows from terminal 58 through collector to emitter of transistor 31, through resistors 45 and 46 to the collector of transistor 28, from the collector to emitter of transistor 28, through resistors 43 and 42 to terminal 41.

When pulses of current are induced in lines 61 and 62 at the same time that a negative pulse is applied to the bases of transistors 26 and 27, currents through transistors 25 and 28 change so that the voltage at signal-output terminal 59 changes. For example, when induced currents $I_3$ and $I_4$ flow in digit lines 61 and 62, as shown in FIG. 1, induced current $I_3$ produces a voltage drop of the polarity shown across resistor 71. The voltage drop across resistor 71 causes a negative voltage at input terminal 37 as shown in waveform E of FIG. 8 at time $t_6$. Induced current $I_4$ produces a voltage drop of the polarity shown across resistor 72. The voltage drop across resistor 72 causes a positive voltage at terminal 36, as shown in waveform D of FIG. 8. At time $t_6$ shown in waveform D of FIG. 8, the positive voltage at terminal 36 causes an increase in current $I_{16}$ from base to emitter of transistor 25 and the negative voltage at terminal 37 causes a decrease in the current of $I_{17}$ from base to emitter of transistor 28. The increase in current $I_{16}$ from base to emitter of transistor 25 causes an increase in current $I_8$ flowing from collector to emitter of transistor 25. The decrease in current between base and emitter of transistor 28 causes a decrease in current $I_9$ from collector to emitter of transistor 28 and causes an increase in the current $I_{14}$ flowing from junction point 24 through base to emitter of transistor 29. The increase in current $I_{14}$ between base and emitter of transistor 29 causes an increase in current $I_{13}$ flowing from junction point 23 through collector to emitter of transistor 29 and causes an increase in current $I_{10}$ flowing from collector to emitter of transistor 30. The increase in current from collector to emitter of transistor 30 causes a decrease in current from base to emitter of transistor 31 and causes a decrease in current through collector to emitter of transistor 31 so that the voltage at output terminal 59 decreases.

The amplifier 11 attenuates common-mode signals at the signal-input terminals 36 and 37 even at the time when a negative pulse is applied to the bases of transistors 26 and 27. Common-mode signals are signals which have the same polarity at signal-input terminals 36 and 37. For example, when a positive signal is applied to terminal 36 and another positive signal having substantially the same value is applied to terminal 37, the increase in current $I_{16}$ to the base of transistor 25 is substantially equal to the increase in current $I_{17}$ to the base of transistor 28. The increase in current $I_{16}$ from base to emitter of transistor 25 causes an increase in current $I_8$ from the collector to the emitter of transistor 25. The increase in current $I_{17}$ from base to emitter of transistor 28 causes substantially the same increase in current $I_9$ from collector to emitter of transistor 28. The increase in current $I_9$ from collector to emitter of transistor 28 causes a decrease in the current $I_{14}$ flowing from junction point 24 through base to emitter of transistor 29. The decrease in current $I_{14}$ between base and emitter of transistor 29 causes a decrease in current $I_{13}$ flowing from junction point 23 through collector to emitter of transistor 29. The current gain of transistor 29 is a −1 so that the decrease in the value of current $I_{13}$ is substantially equal to the increase in current $I_9$ and the increase in current $I_8$ is substantially equal to the increase in current $I_9$. The value of current $I_{10}$ flowing through resistor 56 and collector to emitter of transistor 30 does not change so that there is no change in the voltage drop across resistor 56 and no signal is applied to the base of transistor 31. Since there is no signal at the base of transistor 31 there is no change in the current through collector to emitter of transistor 31 and no change in current through resistor 45 so that there is no signal at output terminal 59. Thus, common-mode signals at signal-input terminals 36 and 37 do not cause any signal on output terminal 59.

Figure 2:
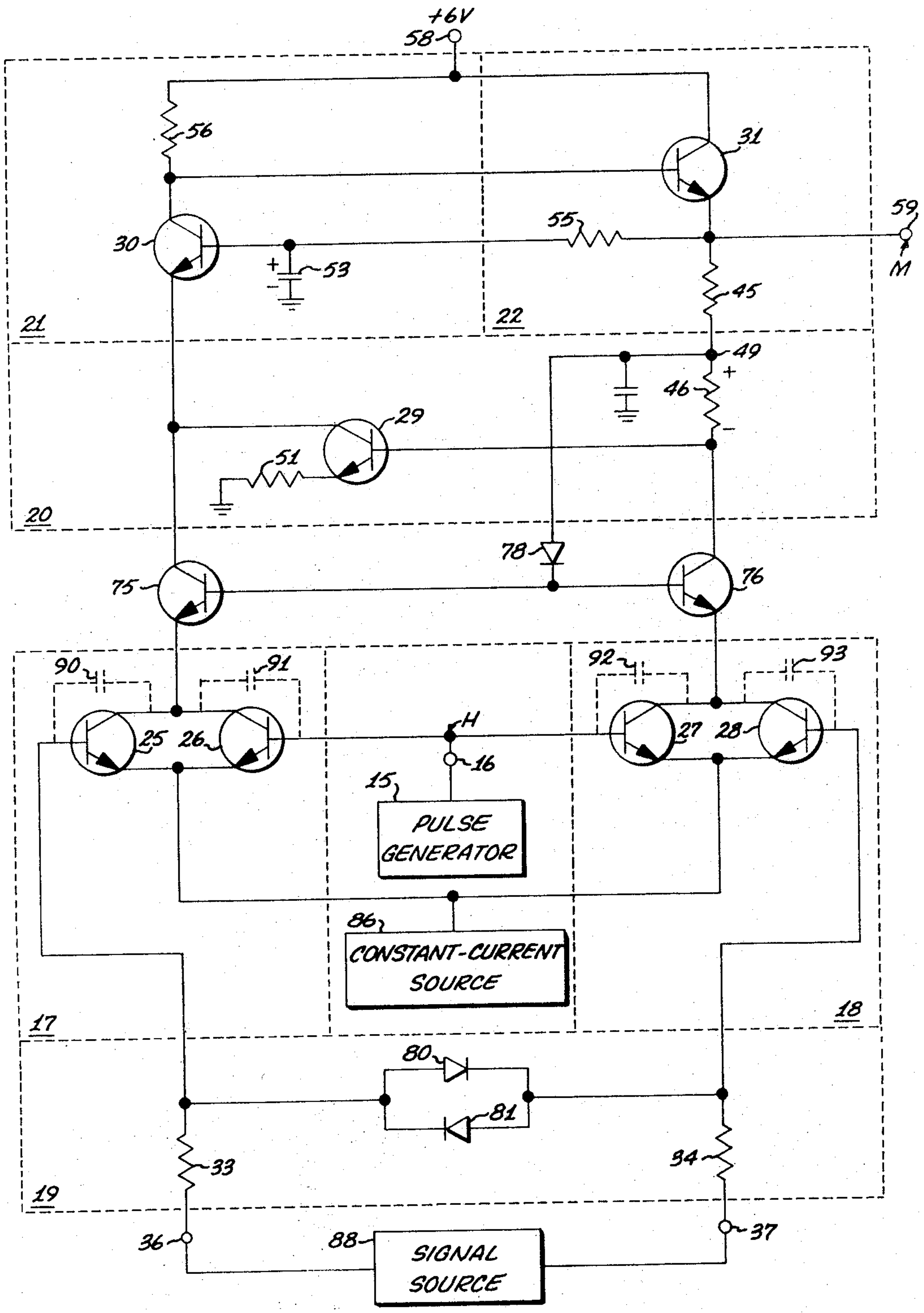
FIG. 2 is a circuit diagram of another embodiment of the instant invention.

FIG. 2 illustrates a second embodiment of the invention shown in FIG. 1 wherein like parts have similar reference characters. The circuit in FIG. 2 differs from the circuit of FIG. 1 in that the digit lines 61 and 62, the word driver 14, the digit driver 13 and the associated circuitry has been replaced by a source of differential signals 88. The source of signals 88 provides a differential signal between signal-input terminals 36 and 37. The circuit of FIG. 2 differs from the circuit of FIG. 1 in that resistors 39, 42 and 43 and the −6 volt source connected to terminal 41 have been replaced by a constant-current source 86. Constant-current source 86 ensures that current through transistors 25 and 26 and transistors 27 and 28 has a substantially constant value. A capacitor 53 and a resistor 55 are connected to the base of transistor 30 to provide a source of bias current for the base of transistor 30 and to provide a signal ground at the base of transistor 30.

A pair of transistors, 75 and 76, connected in a grounded base configuration have been added to the circuit of FIG. 2 to reduce Miller effect in the current-steering circuits 17 and 18. The Miller effect is the effect of the capacitance between the base and the collector of a grounded-emitter transistor circuit such as the current-steering circuits 17 and 18. Due to the physical arrangement of the elements in a transistor, a distributed capacitance exists, inside the transistor, between the collector and the base of each transistor such as those used in FIG. 1. Distributed capacitance between the collector and base of transistors 25–28 are represented by the dashed leads and the dashed configuration of capacitors 90–93. This capacitance provides storage of electrical charges during operation of the circuit. For example, when an increase in signal is applied to the base of transistor 28 in FIG. 1, current $I_{11}$ flowing through resistor 46 increases thereby providing an increase in the voltage drop across resistor 46. The increase in the voltage drop across resistor 46 causes a decrease in the voltage at the collector of transistor 28 thereby causing a change in the voltage across distributed capacitance 93. When the signal at the base of transistor 28 decreases, distributed capacitance 93 provides a charge which prevents an instantaneous change in the voltage at the collector of transistor 28. Thus the charge on distributed capacitance 93 limits the speed of operation of the current-steering circuit 18.

The speed of operation of each of the current-steering circuits may be increased by the addition of a grounded-base circuit between the collector of each grounded-emitter transistor and the collector load resistor of the transistor. The bases of transistors 75 and 76 are connected through diode 78 to a signal ground at junction point 49. Signal ground at junction point 49 is provided by capacitor 47 which supplies a substantially constant value of voltage at junction point 49. The constant value of voltage at junction point 49 provides a substantially constant value of voltage at the base of transistor 76 which in turn provides a substantially constant value of voltage at the collectors of transistors 27 and 28. The substantially constant value of voltage at the collector of transistor 28 reduces the amount of change in the value of the charge on distributed capacitance 93 thus decreasing the time required to discharge distributed capacitance 93 when the signal at the base of transistor 28 changes. Thus, transistor 76 increases the speed of operation of current-steering circuit 18. The constant value of voltage at the base of transistor 75 provides a substantially constant value of voltage at the collectors of transistors 25 and 26 and increases the speed of operation of current-steering circuit 17.

Figure 8:
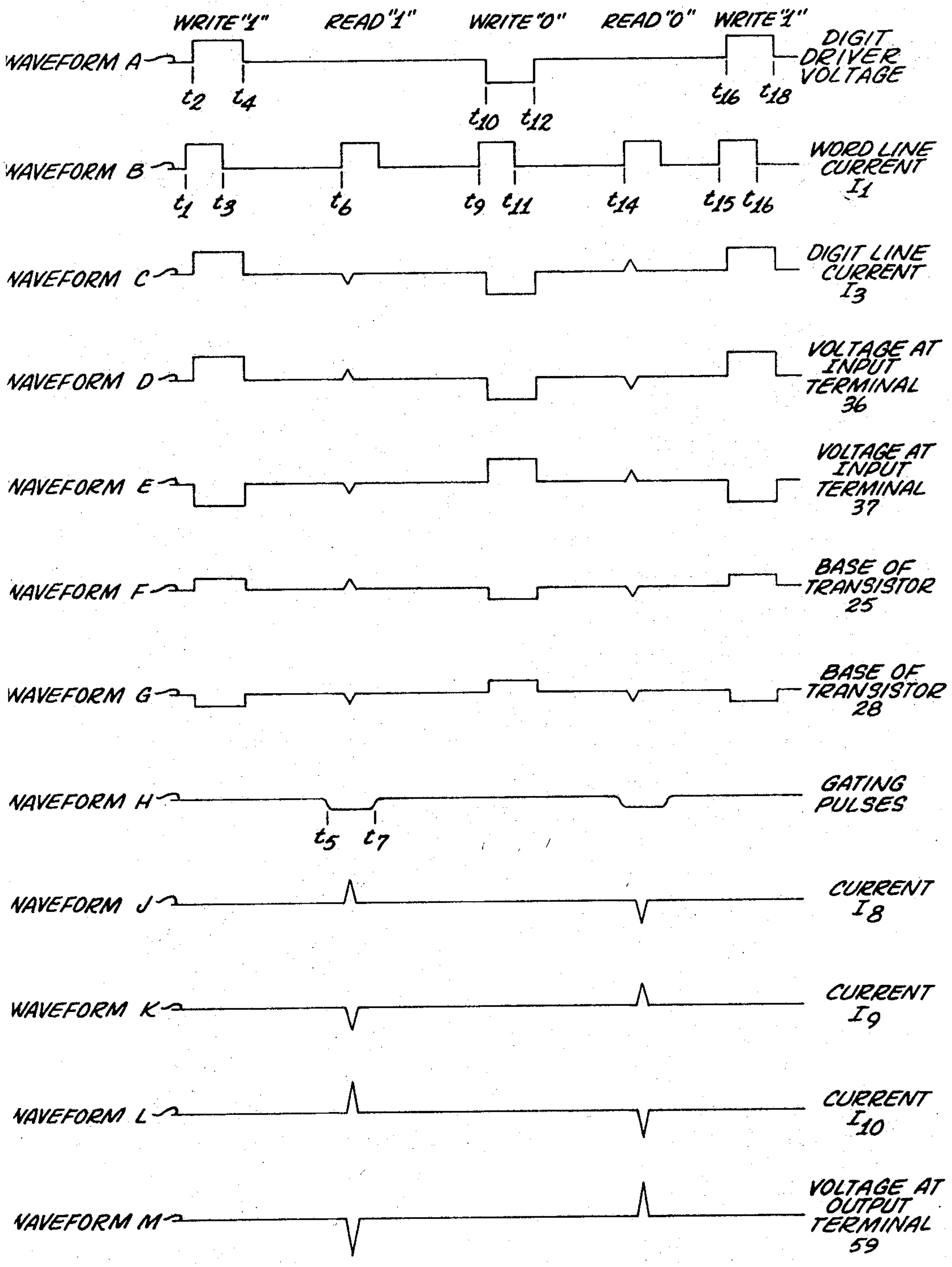
FIG. 8 illustrates waveforms which are useful in explaining the operation of the invention in FIG. 1.

The operation of the balanced amplifier and the writing into and reading information from the memory sites may be more clearly seen by reference to the timing chart shown in FIG. 8.

Waveform A illustrates diagrammatically the voltage at the output lead of digit driver 13.

Waveform B illustrates the word line current $I_1$ provided by word driver 14.

Waveform C illustrates the digit line current $I_3$ in digit line 61.

Waveforms D and E illustrate the signal voltages at signal-input terminals 36 and 37 respectively.

Waveforms F and G illustrate graphically the signal voltages at the bases of transistors 25 and 28 respectively.

Waveform H illustrates graphically the gating pulses applied to the bases of transistors 26 and 27.

Waveforms J and K illustrate graphically the currents through current-steering circuits 17 and 18 respectively.

Waveform L illustrates graphically the current $I_{10}$ supplied by the grounded-base amplifier 21.

Waveform M illustrates graphically the voltage at output terminal 59 of the differential amplifier 11.

While principles of the invention have now been made clear in an illustrated embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are, therefore, intended to cover and embrace any such modifications, within the limits only of the true spirit and scope of the invention.

I claim:

1. A differential to single-ended amplifier comprising: first and second current-steering circuits each having a signal-input lead and a signal-output lead; an inverting amplifier having an input lead and an output lead, said input lead of said inverting amplifier being connected to said signal-output lead of said first steering circuit, said output lead of said inverting amplifier being connected to said signal-output lead of said second steering circuit; first and second signal-input terminals and a signal-output terminal; means for coupling said first signal-input terminal to said signal-input lead of said first steering circuit; means for coupling said second signal-input terminal to said signal-input lead of said second steering circuit; and means for coupling said signal-output terminal to said output lead of said inverting amplifier.

2. A differential to single-ended amplifier comprising: first and second current-steering circuits each having a signal-input lead and a signal-output lead; signal amplitude limiting means, said means being connected between said signal-input lead of said first steering circuit and said signal-input lead of said second steering circuit; an inverting amplifier having an input lead and an output lead, said input lead of said inverting amplifier being connected to said signal-output lead of said first steering circuit, said output lead of said inverting amplifier being connected to said signal-output lead of said second steering circuit; first and second signal-input terminals and a signal-output terminal; means for coupling said first signal-input terminal to said signal-input lead of said first steering circuit; means for coupling said second signal-input terminal to said signal-input lead of said second steering circuit; and means for coupling said signal-output terminal to said output lead of said inverting amplifier.

3. A differential to single-ended amplifier as defined in claim 2 wherein: the means for coupling said signal-output terminal to said output lead of said inverting amplifier includes an amplifying means, said amplifying means being connected between said output lead of said inverting amplifier and said signal-output terminal.

4. A differential to single-ended amplifier as defined in claim 2 wherein: the means for coupling said signal-output terminal to said output lead of said inverting amplifier includes a grounded-base amplifier having an input lead and an output lead; and an emitter follower having an input lead and an output lead, said input lead of said grounded-base amplifier being connected to said output lead of said inverting amplifier, said output lead of said grounded-base amplifier being connected to said input lead of said emitter follower, said output lead of said emitter follower being connected to said signal-output terminal.

5. A gated differential to single-ended amplifier for use with a gating pulse generator and a signal source having first and second output leads, said amplifier comprising: first, second, third, fourth, fifth, sixth and seventh transistors each having a base, a collector and an emitter; first, second and third reference potentials, said base of said first transistor being coupled to said first output lead of said signal source, said bases of said second and said third transistors being connected to said generator, said base of said fourth transistor being coupled to said second output lead of said signal source; first, second, third, fourth, fifth, sixth and seventh resistors, said first resistor being connected between a first junction point and said emitters of said first and said second transistors, said second resistor being connected between said first junction point and said emitter of said third and said fourth transistors, said third resistor being connected between said first junction point and said second potential, said base of said fifth transistor being connected to said collectors of said third and said fourth transistors, said fourth resistor being connected between said emitter of said fifth transistor and said third potential, said collector of said fifth transistor being connected to said collectors of said first and said second transistors, said collector of said fifth transistor being connected to said emitter of said sixth transistor, said fifth resistor being connected between said collector of said sixth transistor and said first potential; a capacitor, said capacitor being connected between said third potential and said base of said sixth transistor, said collector of said seventh transistor being connected to said first potential, said collector of said sixth transistor being connected to said base of said seventh transistor, said sixth resistor being connected between said emitter of said seventh transistor and a second junction point, said seventh resistor being connected between said second junction point and said base of said fifth transistor, said base of said sixth transistor being connected to said second junction point; and an output terminal, said output terminal being connected to said emitter of said seventh transistor.

6. A differential to single-ended amplifier as defined in claim 5 including: signal limiting means, said signal limiting means being connected between said base of said first transistor and said base of said fourth transistor.

7. A gated differential to single-ended amplifier for use with a gating pulse generator and a differential signal source having first and second output leads, said amplifier comprising first, second, third, fourth, fifth, sixth and seventh transistors each having a base, a collector and an emitter; first and second reference potentials, said base of said first transistor being coupled to said first output lead of said signal source, said bases of said second and said third transistors being connected to said generator, said base of said fourth transistor being coupled to said second output lead of said signal source; a constant-current source, said constant-current source being connected to said emitters of said first, second, third and fourth transistors; first, second, third, fourth and fifth resistors, said first resistor being connected between said emitter of said fifth transistor and said second reference potential, said base of said fifth transistor being connected to said collectors of said third and said fourth transistors, said collector of said fifth transistor being connected to said collectors of said first and second transistors, said collector of said fifth transistor being connected to said emitter of said sixth transistor, said second resistor being connected between said collector of said sixth transistor and said first potential; first and second capacitors, said first capacitor being connected between said second potential and said base of said sixth transistor, said second capacitor being connected between said second reference potential and a junction point, said collector of said seventh transistor being connected to said first potential, said collector of said sixth transistor being connected to said base of said seventh transistor, said third resistor being connected between said emitter of said seventh transistor and said junction point, said fourth resistor being connected between said junction point and said base of said fifth transistor, said fifth resistor being connected between said base of said sixth transistor and said emitter of said seventh transistor; and an output terminal, said output terminal being connected to said emitter of said seventh transistor.

8. A differential to single-ended amplifier as defined in claim 7 including: signal limiting means, said signal limiting means being connected between said base of said first transistor and said base of said fourth transistor.

9. A differential to single-ended amplifier comprising: first and second current-steering circuits each having a signal-input lead and a signal-output lead; signal amplitude limiting means, said means being connected between said signal-input lead of said first steering circuit and said signal-input lead of said second steering circuit; first and second grounded-base amplifiers each having an input lead and an output lead; an inverting amplifier having an input lead and an output lead, said input lead of said first grounded-base amplifier being connected to said signal-output lead of said first steering circuit, said output lead of said first grounded-base amplifier being connected to said output lead of said inverting amplifier, said input lead of said second grounded-base amplifier being connected to said signal-output lead of said second steering circuit, said output lead of said second grounded-base amplifier being connected to said input lead of said inverting amplifier; first and second signal-input terminals and a signal-output terminal; means for coupling said signal-input terminal to said signal input lead of said first steering circuit; means for coupling said second signal-input terminal to said signal-input lead of said second steering circuit; and means for coupling said signal-output terminal to said output lead of said inverting amplifier.

10. A differential to single-ended amplifier as defined in claim 9 wherein: the means for coupling said signal-output terminal to said output lead of said inverting amplifier includes an amplifying means, said amplifying means being connected between said output lead of said inverting amplifier and said signal-output terminal.

11. A gated differential to single-ended amplifier for use with a gating pulse generator and a signal source having first and second output leads, said amplifier comprising: first, second, third, fourth, fifth, sixth, seventh, eighth and ninth transistors each having a base, a collector and an emitter; first, second and third reference potentials, said base of said first transistor being coupled to said first output lead of said signal source, said bases of said second and said third transistors being connected to said generator, said base of said fourth transistor being coupled to said second output lead of said signal source; first, second, third, fourth, fifth, sixth, seventh and eighth resistors, said first resistor being connected between a first junction point and said emitters of said first and second transistors, said second resistor being connected between said first junction point and said emitters of said third and said fourth transistors, said third resistor being connected between said first junction point and said second potential, said emitter of said eighth transistor being connected to said collectors of said first and said second transistors, said collector of said eighth transistor being connected to said collector of said fifth transistor, said emitter of said ninth transistor being connected to said collectors of said third and said fourth transistors, said collector of said ninth transistor being connected to said base of said fifth transistor, said fourth resistor being connected between said emitter of said fifth transistor and said third potential, said collector of said fifth transistor being connected to said emitter of said sixth transistor, said fifth resistor being connected between said collector of said sixth transistor and said first potential; first and second capacitors, said first capacitor being connected between said third potential and said base of said sixth transistor, said second capacitor being connected between said second reference potential and a second junction point, said collector of said sixth transistor being connected to said base of said seventh transistor, said collector of said seventh transistor being connected to said first potential; diode means, said diode means being connected between said second junction point and said bases of said eighth and said ninith transistors, said sixth resistor being connected between said second junction point and said emitter of said seventh transistor, said seventh resistor being connected between said second junction point and said base of said fifth transistor, said eighth resistor being connected between said base of said sixth transistor and said emitter of said seventh transistor; and an output terminal, said output terminal being connected to said emitter of said seventh transistor.

12. A differential to single-ended amplifier as defined in claim 11 including: signal limiting means, said signal limiting means being connected between said base of said first transistor and said base of said fourth transistor.

13. A gated differential to single-ended amplifier for use with a gating pulse generator and a signal source having first and second output leads, said amplifier comprising: first, second, third, fourth, fifth, sixth, seventh, eighth and ninth transistors each having a base, a collector and an emitter; first and second reference potentials, said base of said first transistor being coupled to said first output lead of said signal source, said bases of said second and said third transistors being connected to said generator, said base of said fourth transistor being coupled to said second output lead of said signal source; a constant-current source, said constant-current source being connected to said emitters of said first, second, third and fourth transistors; first, second, third, fourth and fifth resistors, said emitter of said eighth transistor being connected to said collectors of said first and said second transistors, said collector of said eighth transistor being connected to said collector of said fifth transistor, said emitter of said ninth transistor being connected to said collectors of said third and said fourth transistors, said collector of said ninth transistor being connected to said base of said fifth transistor, said first resistor being connected between said emitter of said fifth transistor and said second potential, said collector of said fifth transistor being connected to said emitter of said sixth transistor, said second resistor being connected between said collector of said sixth transistor and said first potential; first and second capacitors, said first capacitor being connected between said second potential and said base of said sixth transistor, said second capacitor being connected between said second reference potential and a junction point, said collector of said sixth transistor being connected to said base of said seventh transistor, said collector of said seventh transistor being connected to said first potential; diode means, said diode means being connected between said junction point and said bases of said eighth and said ninth transistors, said third resistor being connected between said junction point and said emitter of said seventh transistor, said fourth resistor being connected between said junction point and said base of said fifth transistor, said fifth resistor being connected between said base of said sixth transistor and said emitter of said seventh transistor; and an output terminal, said output terminal being connected to said emitter of said seventh transistor.

14. A differential to single-ended amplifier as defined in claim 13 including: signal limiting means, said signal limiting means being connected between said base of said first transistor and said base of said fourth transistor.

References Cited

UNITED STATES PATENTS

| | | | |
|---|---|---|---|
| 3,370,245 | 2/1968 | Royce et al. | 330—69 X |
| 3,392,346 | 7/1968 | Staubus | 330—30 X |

ROY LAKE, Primary Examiner

L. J. DAHL, Assistant Examiner

U.S. Cl. X.R.

307—243; 330—69

PO-1050
(5/69)

UNITED STATES PATENT OFFICE
CERTIFICATE OF CORRECTION

Patent No. 3,466,562 Dated September 9, 1969

Inventor(s) Bohumir Sramek

It is certified that error appears in the above-identified patent and that said Letters Patent are hereby corrected as shown below:

In the Specification:

Column 1, line 5, after "85019" insert

-- , assignor to General Electric

Company, a corporation of New York. --

OCT 27 1970

(SEAL)
Attest:

Edward M. Fletcher, Jr.
Attesting Officer

WILLIAM E. SCHUYLER, JR.
Commissioner of Patents